(12) United States Patent
Ohashi (10) Patent No.: US 8,607,909 B2
(45) Date of Patent: Dec. 17, 2013

(54) FUEL CELL VEHICLE

(75) Inventor: Yasuhiko Ohashi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 39 days.

(21) Appl. No.: 13/377,447

(22) PCT Filed: Jun. 9, 2009

(86) PCT No.: PCT/JP2009/060493
§ 371 (c)(1),
(2), (4) Date: Dec. 9, 2011

(87) PCT Pub. No.: WO2010/143262
PCT Pub. Date: Dec. 16, 2010

(65) Prior Publication Data
US 2012/0080251 A1 Apr. 5, 2012

(51) Int. Cl.
*B60R 16/08* (2006.01)
(52) U.S. Cl.
USPC .............. 180/68.5; 180/65.31; 180/65.51; 180/65.1
(58) Field of Classification Search
USPC .............. 180/65.51, 65.31, 65.1, 68.5
See application file for complete search history.

(56) References Cited

U.S. PATENT DOCUMENTS

2002/0121772 A1   9/2002   Koster

FOREIGN PATENT DOCUMENTS

| JP | 2000219049 A | 8/2000 |
|----|--------------|--------|
| JP | 2004122972 A | 4/2004 |
| JP | 2005132348 A | 5/2005 |
| JP | 2005205945 A | 8/2005 |
| JP | 2007106361 A | 4/2007 |
| JP | 2008143464 A | 6/2008 |
| JP | 2008247320 A | 10/2008 |

OTHER PUBLICATIONS

European Patent Office, Extended Search Report in European Application No. 09845787.2, dated Dec. 11, 2012.
Concise Explanation of Relevance under 37 C.F.R. §1.98(a)(3)(i).
Japanese Patent Office, International Search Report in International application No. PCT/JP2009/060493, mailed Sep. 1, 2009.

*Primary Examiner* — Jeffrey J Restifo
*Assistant Examiner* — Erez Gurari
(74) *Attorney, Agent, or Firm* — Kenyon & Kenyon LLP (57) ABSTRACT

This fuel cell vehicle FCV is provided with a fuel cell FC as well as a first tank and a second tank, which store a reaction gas to be supplied to the fuel cell FC. The first tank and the second tank are arranged in the front area of the fuel cell vehicle FCV. The second tank is arranged nearer to a rear area than the first tank and arrangement is performed so that the positions of the tanks are out of alignment in a vertical direction. This configuration enables compatibility to be ensured between an increase in the tank capacity of the fuel cell vehicle and an increase in the space in a passenger room and a trunk, and is capable of absorbing the impact of a collision even if the collision occurs.

2 Claims, 8 Drawing Sheets

FUEL CELL VEHICLE

CROSS REFERENCE TO RELATED APPLICATION

This is a 371 national phase application of PCT/JP2009/060493 filed Jun. 9, 2009, the content of which is incorporated herein by reference in its entirety.

BACKGROUND OF THE INVENTION

1. Field of the Invention

The present invention relates to a fuel cell vehicle on which a fuel cell is mounted.

2. Description of the Related Art

As such a fuel cell vehicle, there is known a fuel cell vehicle in which a fuel cell and a tank storing a reaction gas are arranged under the floor of a cabin. However, in a fuel cell vehicle in which a tank is arranged under the floor as in this case, an increase in the capacity of the tank results in a reduction in the space of a passenger room. Therefore, it has been difficult to ensure the compatibility between an increase in the tank capacity and an increase in the space in the passenger room. To cope with this situation, in order to ensure the compatibility between an increase in the tank capacity and an increase in the space in the passenger room, it has been proposed to arrange the tank in the vicinity of an axle in the front area of the fuel cell vehicle (refer to Japanese Patent Laid-Open No. 2004-122972, for example).

In the above-described conventional art, however, because of the arrangement of the tank in the vicinity of an axle in the front area of the fuel cell vehicle, for example, in the case of a collision of the fuel cell vehicle, the impact of the collision might not be absorbed completely. On the other hand, it is also conceivable to arrange the tank in a trunk in the rear area of the fuel cell vehicle. In this case, however, the space in the trunk is reduced. And in the case where the front wheels are used as driving wheels, it is advisable to arrange heavy loads, such as the tank, in the front area as far as possible.

The present invention was made in view of such problems and the object of the invention is to provide a fuel cell vehicle which enables compatibility to be ensured between an increase in the tank capacity of the fuel cell vehicle and an increase in the space in a passenger room and a trunk, and is capable of absorbing the impact of a collision even if the collision occurs.

SUMMARY OF THE INVENTION

In order to solve the above-described problems, the fuel cell vehicle of the present invention is a fuel cell vehicle which comprises: a fuel cell which generates electricity by an electrochemical reaction when supplied with a reaction gas; and a gas storage section which stores the reaction gas to be supplied to the fuel cell or a raw material gas which becomes the reaction gas. In this fuel cell vehicle, the gas storage section has at least a first tank and a second tank. The first tank and the second tank are arranged in the front area of the fuel cell vehicle. The second tank is arranged nearer to the rear area than the first tank and arrangement is performed so that the respective positions of the tanks are out of alignment in a vertical direction.

In the present invention, the first tank and the second tank, which constitute the gas storage section, are arranged in the front area of the fuel cell vehicle, whereby it becomes unnecessary to arrange the first tank and the second tank below the passenger room, making it possible to contribute to an increase in the space in the passenger room. Besides, because weight distribution can be performed in such a manner as to position heavy loads near the front area, it is possible to keep driving performance good when the front wheels are used as driving wheels. Furthermore, in the present invention, attention is paid to the characteristics of the first and second tanks constituting the gas storage section. The inside of the first and second tanks which store a reaction gas or a raw material gas obtains a high pressure, and hence the tanks are fabricated robust in such a manner as to be able to withstand the high pressure and in order to prevent breakage by the impact from the outside. In the present invention, by using the strength of the first tank and the second tank, it is ensured that even when mutual interference occurs, this mutual interference does not lead to breakage. Specifically, tanks constituting the gas storage section are divided into at least two parts, a first tank and a second tank, and the tanks are arranged so that the positions of the tanks are out of alignment in a vertical direction. Because the first tank and the second tank are arranged in an off-set manner like this, even when the fuel cell vehicle collides and an impact is applied, with the result that the first tank and the second tank come close to each other and interfere with each other, it is possible to absorb the impact while changing the relative positional relation by increasing the amount of offset in a vertical position.

In the fuel cell vehicle of the present invention, it is also preferred that the second tank be arranged in a position lower than the first tank. When an impact by a collision as described above is applied, the forward first tank moves backward and the backward second tank moves forward, resulting in a condition in which the first tank and the second tank interfere with each other. Because in this preferable aspect the second tank is arranged in a position lower than the first tank, it is possible to adopt a configuration which is such that in the case where the tanks come close to each other and interfere with each other, the backward second tank moves backward while being pushed further below by the first tank. And it becomes possible to adopt a configuration which is such that the impetus of the backward movement of the forward first tank is greatly reduced by the interference with the second tank. Therefore, it becomes possible to control the direction in which the first tank and the second tank move backward during a collision and hence it is possible to positively avoid a situation in which the first tank and the second tank hit passengers and other equipment.

In the fuel cell vehicle of the present invention, it is also preferred that the first tank and the second tank be fixed to a cross member extending in the width direction of the fuel cell vehicle, and that the cross member have a brittle portion between a part which fixes the above-described first tank and a part which fixes the above-described second tank. When an impact by a collision as described above is applied, the forward first tank moves backward and the backward second tank moves forward, and hence external forces are applied to the cross member which fixes the first tank and the second tank, with the result that breakage occurs from the brittle portion. For this reason, by adjusting the shape of the cross member and the position and the mode of the brittle portion, it becomes easy to control the behavior of the first tank and the second tank during a collision. Furthermore, it becomes possible to regulate the behavior of the first tank and the second tank after a collision by using the cross member and, therefore, it is possible to reduce the amount of movement of the first tank and the second tank after a collision.

In the fuel cell vehicle of the present invention, it is also preferred that a driving motor for driving wheels be arranged in the vicinity of the wheels. In this aspect, because a driving motor for driving wheels is arranged in the vicinity of the wheels, no motor is arranged in the engine room in the front area. For this reason, an increase is produced in the degree of freedom of the arrangement of equipment in the engine room and it becomes possible to make the arrangement of the first tank and second tank of the present invention more appropriate.

Appropriate combinations of the preferred aspects described above can also be included in the scope of the present invention whose protection is demanded by a patent through this application for the patent.

According to the present invention, it is possible to provide a fuel cell vehicle which enables compatibility to be ensured between an increase in the tank capacity of the fuel cell vehicle and an increase in the space in a passenger room and a trunk, and is capable of absorbing the impact of a collision even if the collision occurs.

DETAILED DESCRIPTION OF THE PREFERRED EMBODIMENTS

Hereinafter an embodiment of the present invention will be described with reference to the accompanying drawings. In order to facilitate the understanding of the description, in each of the drawings the same component elements bear the same reference symbols as far as possible and repetition of descriptions thereof are omitted.

Figure 1:
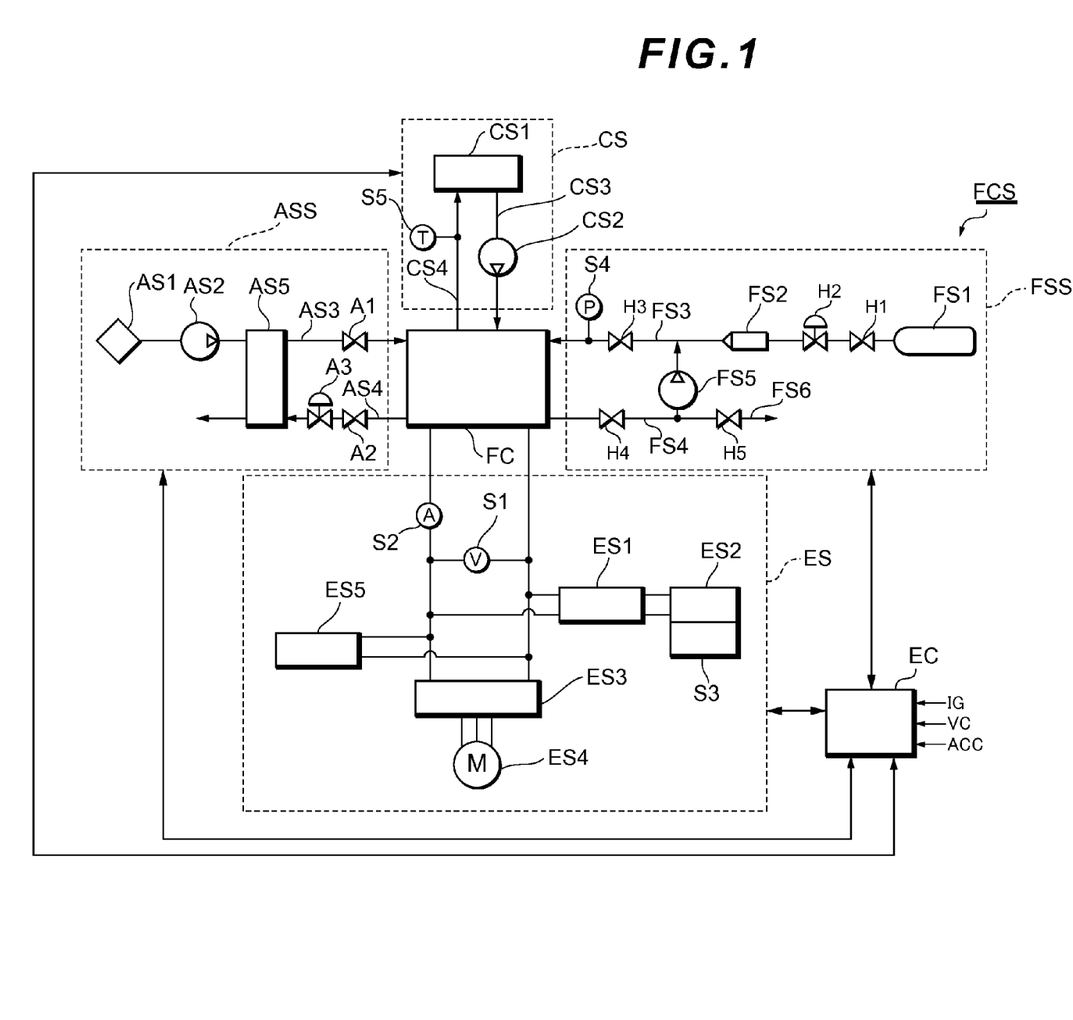
FIG. 1 is a diagram showing the configuration of a fuel cell system to be mounted on a fuel cell vehicle which is an embodiment of the present invention.

First, with reference to FIG. 1 a description will be given of a fuel cell system FCS to be mounted on a fuel cell vehicle which is an embodiment of the present invention. FIG. 1 is a diagram showing the system configuration of a fuel cell system FCS which functions as a vehicle-mounted power supply system of a fuel cell vehicle. The fuel cell system FCS can be mounted on a vehicle, such as a fuel cell vehicle (FCV), an electric vehicle, and a hybrid vehicle.

The fuel cell system FCS is provided with a fuel cell FC, an oxidation gas supply system ASS, a fuel gas supply system FSS, a power system ES, a cooling system CS, and a controller EC. The fuel cell FC generates electricity when supplied with a reaction gas (a fuel gas, an oxidization gas). The oxidation gas supply system ASS is a system for supplying air as an oxidation gas to the fuel cell FC. The fuel gas supply system FSS is a system for supplying hydrogen gas as a fuel gas to the fuel cell FC. The power system ES is a system for controlling the charge and discharge of electric power. The cooling system CS is a system for cooling the fuel cell FC. The controller EC is a controller which performs the supervisory control of the whole fuel cell system FCS.

The fuel cell FC is configured as a solid polyelectrolyte type cell stack which is made by laminating a large number of cells (single cells provided with an anode, a cathode, and an electrolyte (power-generating bodies)). In the fuel cell FC, the oxidation reaction of Formula (1) occurs in the anode and the reduction reaction of Formula (2) occurs in the cathode. The electrogenic reaction of Formula (3) occurs for the whole fuel cell FC.

$$H_2 \rightarrow 2H^+ + 2e^- \tag{1}$$

$$(½)O_2 + 2H^+ + 2e^- \rightarrow H_2O \tag{2}$$

$$H_2 + (½)O_2 \rightarrow H_2O \tag{3}$$

The oxidation gas supply system ASS has an oxidation gas flow path AS3 and an oxidation off-gas flow path AS4. The oxidation gas flow path AS3 is a flow path in which an oxidation gas to be supplied to the cathode of the fuel cell FC flows. The oxidation off-gas flow path AS4 is a flow path in which an oxidation off-gas discharged from the fuel cell FC flows.

The oxidation gas flow path AS3 is provided with an air compressor AS2, a humidifier AS5, and a shutoff valve A1. The air compressor AS2 is a compressor for taking in an oxidation gas from the atmosphere via a filter AS1. The humidifier AS5 is a humidifier for humidifying an oxidation gas pressurized by the air compressor AS2. The shutoff valve A1 is a valve for shutting off the oxidation gas supply to the fuel cell FC.

The oxidation off-gas flow path AS4 is provided with a shutoff valve A2, a back-pressure regulating valve A3, and a humidifier AS5. The shutoff valve A2 is a valve for shutting off an oxidation off-gas from the fuel cell FC. The back-pressure regulating valve A3 is a valve for regulating the oxidation gas supply pressure. The humidifier AS5 is provided in order to perform moisture exchange between an oxidation gas (a dry gas) and an oxidation off-gas (a wet gas).

The fuel gas supply system FSS has a fuel gas supply source FS1 (a gas storage section), a fuel gas flow path FS3, a circulating flow path FS4, a circulating pump FS5, and an exhaust/discharge flow path FS6. The fuel gas flow path FS3 is a flow path in which a fuel gas supplied from the fuel gas supply source FS1 to the anode of the fuel cell FC. The circulating flow path FS4 is a flow path for returning a fuel off-gas discharged from the fuel cell FC to the fuel gas flow path FS3. The circulating pump FS5 is a pump which feeds a fuel off-gas in the circulating flow path FS4 under pressure to the fuel gas flow path FS3. The exhaust/discharge flow path FS6 is a flow path connected in a branched manner to the circulating flow path FS4.

The fuel gas supply source FS1 is made of a hydrogen storage metal, for example, and stores a high-pressure (for example, 35 MPa to 70 MPa) hydrogen gas. In the case of this embodiment, the fuel gas supply source FS1 is configured with a high-pressure hydrogen tank. The fuel gas supply source FS1 may be made up of a reformer which generates a hydrogen-rich reformed gas from a hydrocarbon-based fuel and a high-pressure gas tank which brings the reformed gas generated in this reformer to a high-pressure state and accumulates the high-pressure reformed gas. When the shutoff valve H1 is opened, a fuel gas flows out of the fuel gas supply source FS1 to the fuel gas flow path FS3. The fuel gas is reduced in pressure to the order of 200 kPa, for example, by means of a regulator H2 and an injector FS2, and is supplied to the fuel cell FC.

The fuel gas flow path FS3 is provided with a shutoff valve H1, a regulator H2, an injector FS2, a shutoff valve H3, and a pressure sensor S4. The shutoff valve H1 is a valve for shutting off or allowing the supply of a fuel gas from the fuel gas supply source FS1. The regulator H2 regulates the pressure of a fuel gas. The injector FS2 controls the fuel gas supply volume to the fuel cell FC. The shutoff valve H3 is a valve for shutting off the fuel gas supply to the fuel cell FC.

The regulator H2 is a device which regulates the pressure on the upstream side thereof (a primary pressure) to a secondary pressure which is set beforehand, and is configured with for example, a mechanical-type pressure reducing valve which reduces the primary pressure. The mechanical-type pressure reducing valve has a housing in which a back-pressure chamber and a pressure regulating chamber are formed by being separated from a diaphragm, and this mechanical-type pressure reducing valve has a configuration which is such that in the pressure regulating chamber, the primary pressure is reduced by the back-pressure in the back-pressure chamber to a prescribed pressure to obtain the secondary pressure. The regulator H2 is arranged on the upstream side of the injector FS2, whereby it is possible to effectively reduce the pressure on the upstream side of the injector FS2. For this reason, for the mechanical structures (valve body, housing, flow path, driving device and the like) of the injector FS2, it is possible to increase the degree of freedom of design. It is also possible to restrain the phenomenon that it becomes difficult for the valve body of the injector FS2 to move due to an increase in a pressure difference between the upstream side pressure and downstream side pressure of the injector FS2.

The injector FS2 is an electromagnetically-driven on-off valve capable of regulating gas flow rate and gas pressure by driving a valve body by an electromagnetically-driving force directly in a prescribed driving cycle and thereby isolating the valve body from a valve seat. The injector FS2 is provided with a valve seat having an injection hole from which a gaseous fuel, such as a fuel gas, is injected, a nozzle body which supplies and guides the gaseous fuel to the injection hole, and a valve body which is housed and held in such a manner as to be able to move in the direction of axis line (the gas flow direction) with respect to this nozzle body and opens and closes the injection hole.

The valve body of the injector FS2 is driven by a solenoid which is an electromagnetically-driving device, and is configured to be able to control the gas injection time and gas injection timing of the injector FS2 at a control signal outputted from the controller EC. In order to supply the gas flow rate required downstream of the injector FS2, the injector FS2 regulates the gas flow rate (or the hydrogen molar concentration) supplied to the downstream side by changing at least either the opening area (opening) or the open time of the valve body provided in the gas flow path of the injector FS2.

The circulating flow path FS4 is provided with a shutoff valve H4 and the exhaust/discharge flow path FS6 is connected to the circulating flow path FS4. The exhaust/discharge flow path FS6 is provided with an exhaust/discharge valve H5. The exhaust/discharge valve H5 is a valve for discharging to the outside the fuel off-gas and moisture in the circulating flow path FS4 which contain impurities by operating under instructions from the controller EC. The concentrations of the impurities in the fuel off-gas in the circulating flow path FS4 are lowered by opening the exhaust/discharge valve H5, and it is possible to raise the hydrogen concentration in the fuel off-gas circulating in the circulating system.

The fuel off-gas discharged via the exhaust/discharge valve H5 is mixed with an oxidation off-gas flowing in the oxidation off-gas flow path AS4 and diluted by a diluter (not shown). The circulating pump FS5 circulates and supplies the fuel off-gas in the circulating system to the fuel cell FC by driving a motor.

The power system ES is provided with a DC/DC converter ES1, a battery ES2, a traction inverter ES3, a traction motor ES4, and auxiliaries ES5. The fuel cell system FCS is configured as a parallel hybrid system which is such that the DC/DC converter ES1 and the traction inverter ES3 are connected in parallel to the fuel cell FC.

The DC/DC converter ES1 has the function of boosting the DC voltage supplied from the battery ES2 and outputting the boosted DC voltage to the traction inverter ES3, and the function of lowering the DC power generated by the fuel cell FC or the regenerative electric power recovered by the traction motor ES4 by regenerative braking and charging the battery ES2. The charge and discharge of the battery ES2 is controlled by these functions of the DC/DC converter ES1. And the operating points (output terminal voltage and output current) of the fuel cell FC are controlled by the voltage conversion control performed by the DC/DC converter ES1. The fuel cell FC is provided with a voltage sensor S1 and a current sensor S2. The voltage sensor S1 is a sensor for detecting the output terminal voltage of the fuel cell FC. The current sensor S2 is a sensor for detecting output current of the fuel cell FC.

The battery ES2 functions as a storage source of surplus power, a regenerative energy storage source during regenerative braking, and an energy buffer during load variations resulting from the acceleration or deceleration of a fuel cell vehicle. For example, a nickel-cadmium storage battery, a nickel-hydrogen storage battery and a secondary battery, such as a lithium secondary battery, are preferred as the battery ES2. The battery ES2 is provided with a SOC sensor S3 for detecting SOC (state of charge).

The traction inverter ES3 is, for example, a PWM inverter driven by the pulse-width modulation method. The traction inverter ES3 controls the rotary torque of the traction motor ES4 by converting the DC voltage outputted from the fuel cell FC or the battery ES2 under control instructions from the controller EC to a three-phase AC voltage. The traction motor ES4 is, for example, a three-phase AC motor and constitutes the power source of a fuel cell vehicle.

The auxiliaries ES5 provide a generic name for each motor arranged in each part in the fuel cell system FCS (for example, power sources of pumps, etc.), inverters for driving these motors, and various kinds of vehicle-mounted auxiliaries (for example, air compressor, injector, cooling water circulating pump, and radiator).

The cooling system has a radiator CS1, a coolant pump CS2, a going coolant path CS3, and a returning coolant path CS4. The radiator CS1 dissipates heat from the coolant for cooling the fuel cell FC, thereby cooling the coolant. The coolant pump CS2 is a pump for circulating the coolant between the fuel cell FC and the radiator CS1. The going coolant path CS3 is a flow path which connects the radiator CS1 to the fuel cell FC, and is provided with the coolant pump CS2. Driving the coolant pump CS2 causes the coolant to flow through the going coolant path CS3 from the radiator CS1 to the fuel cell FC. The returning coolant path CS4 is a flow path which connects the fuel cell FC to the radiator CS1, and is provided with a water temperature sensor S5. Driving the coolant pump CS2 causes the coolant which has cooled the fuel cell FC to return to the radiator CS1.

The controller EC is a computer system provided with a CPU, a ROM, a RAM, and input and output interfaces, and controls each part of the fuel cell system FCS. For example, on receiving a start signal IG outputted from an ignition switch, the controller EC starts the operation of the fuel cell system FCS. After that, the controller EC finds the power demand of the whole fuel cell system FCS on the basis of an accelerator opening signal ACC outputted from an acceleration sensor, a vehicle speed signal VC outputted from a vehicle speed sensor, and the like. The power demand of the whole fuel cell system FCS is a total value of vehicle driving power and auxiliaries power.

The auxiliaries power includes the power consumed in the vehicle-mounted auxiliaries (humidifier, air compressor, hydrogen pump, cooling water circulating pump, etc.), the power consumed in the devices necessary for vehicle driving (transmission, wheel controller, steering apparatus, suspension system, etc.), and the power consumed in the devices arranged in the passenger space (air conditioner, lighting fixture, audio device, etc.).

And the controller EC determines the distribution of the respective output power for the fuel cell FC and the battery ES2. The controller EC controls the oxidation gas supply system ASS and the fuel gas supply system FSS so that the amount of generated electrical energy of the fuel cell FC becomes equal to a target power, and controls the operating points (output terminal voltage and output current) of the fuel cell FC by controlling the DC/DC converter ES1. Furthermore, in order that a target torque suited to an accelerator opening is obtained, the controller EC outputs to the traction inverter ES3 each AC voltage instruction value of the U-phase, V-phase and W-phase, for example, as switching instructions, and thereby controls the output torque and rotation speed of the traction motor ES4. Furthermore, by controlling the cooling system CS, the controller EC performs control so that the fuel cell FC obtains an appropriate temperature.

Figure 2:
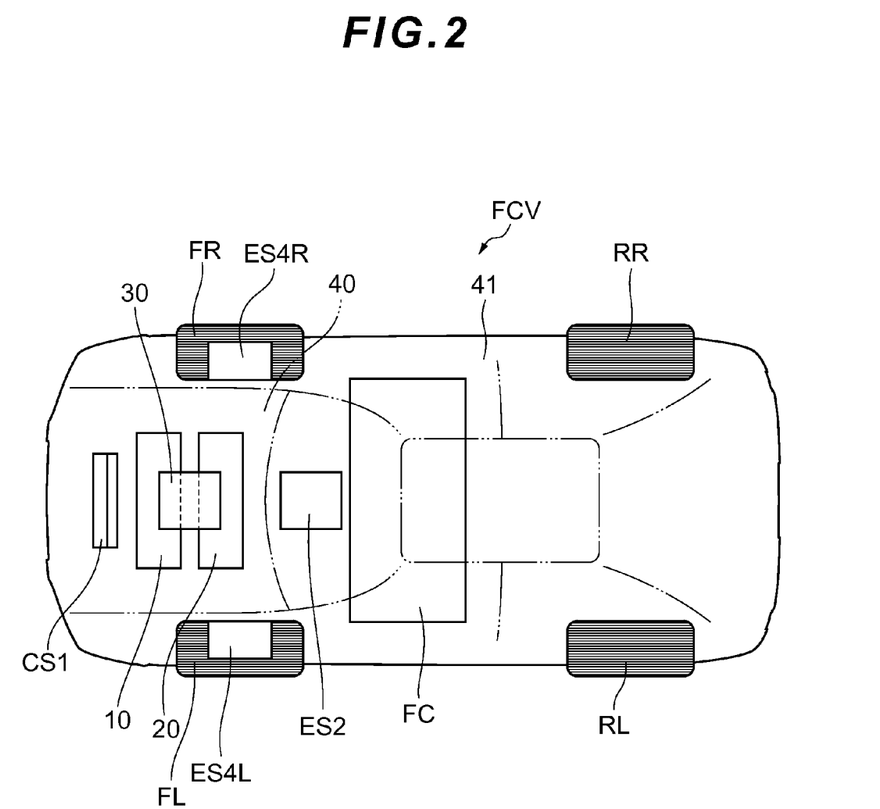
FIG. 2 is a plan view showing the fuel cell system shown in FIG. 1, which is mounted on a fuel cell vehicle.

Subsequently, with reference to FIG. 2, a description will be given of a concrete mode of mounting the fuel cell system FCS on the fuel cell vehicle FCV. FIG. 2 is a plan view showing the fuel cell system FCS mounted on the fuel cell vehicle FCV. The fuel cell vehicle FCV shown in FIG. 2 is provided with the traction motor ES4 shown in FIG. 1 in a quantity of two as a right front-wheel motor ES4R and as a left front-wheel motor ES4L. The right front-wheel motor ES4R is a driving motor for driving a right front-wheel FR, and is arranged in the right front wheel FR in the vicinity of the right front wheel FR. The left front-wheel motor ES4L is a driving motor for driving a left front-wheel FL, and is arranged in the right front wheel FR in the vicinity of the right front wheel FL. Therefore, the right rear wheel RR and the left rear wheel RL are configured as driven wheels. The type of the driving motors is not limited to such an in-wheel type, and may also be an ordinary FF motor and FR motor, a 4WD motor, and an in-wheel motor of 4WD-FR.

In an engine room 40 of the fuel cell vehicle FCV, a radiator CS1, a first tank 10, a second tank 20, and a PCU (power control unit) 30 are arranged. The first tank 10 and the second tank 20 are gas tanks constituting the fuel gas supply source FS1. The first tank 10 and the second tank 20 are configured to be cylindrical, for example, by applying an aluminum alloy lining to a carbon fiber composite material so that high-pressure hydrogen gas can be stored in the interior thereof. The first tank 10 and the second tank 20 are arranged in the engine room 40 along the width direction thereof, and these tanks are arranged in substantially parallel relation to each other. The PCU 30 is a unit which controls the whole driving system of the fuel cell vehicle FCV, and includes the controller EC.

The fuel cell FC and the battery ES2 are arranged below the passenger room 41 of the fuel cell vehicle FCV. It is also preferred that the DC/DC converter ES1 be arranged in the position of the battery ES2.

Figure 3:
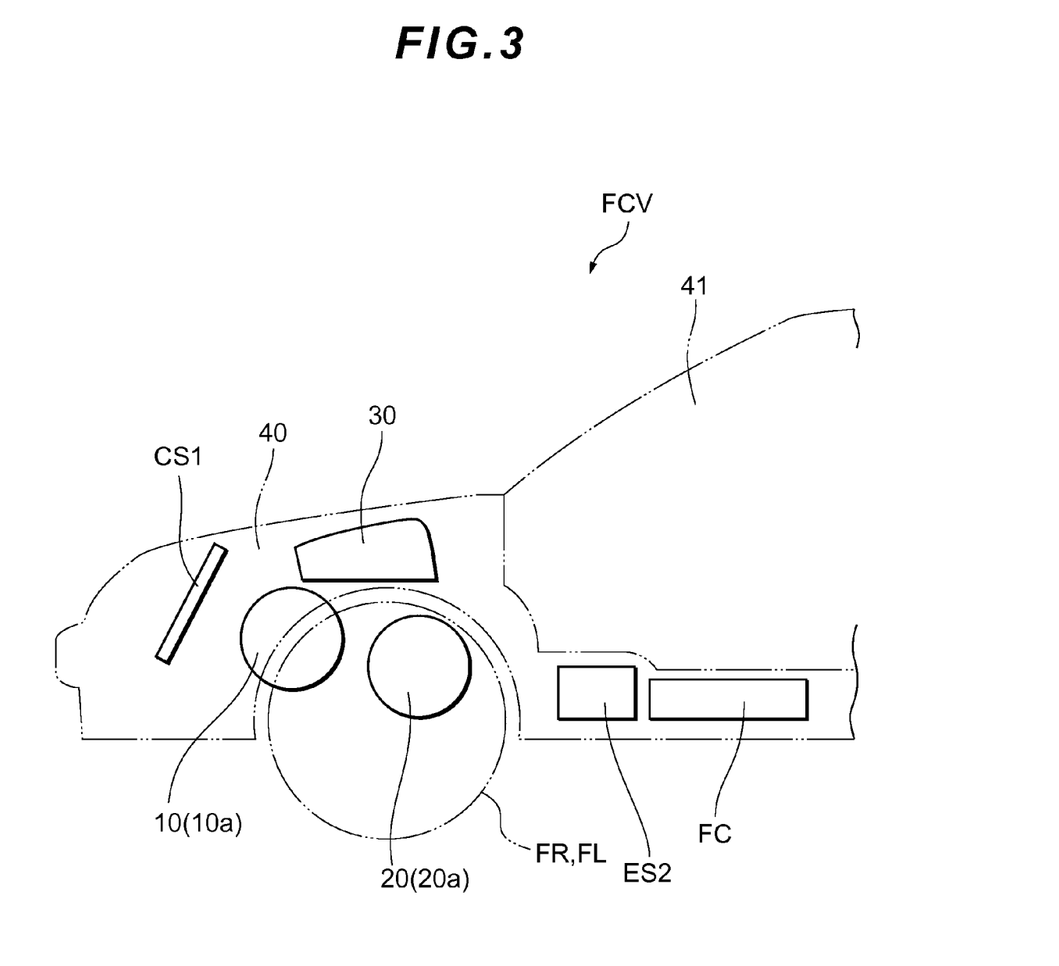
FIG. 3 is a side view showing the fuel cell system shown in FIG. 1, which is mounted on a fuel cell vehicle.

FIG. 3 is a side view showing the fuel cell system mounted on the fuel cell vehicle FCV. As shown in FIG. 3, the fuel cell FC and the battery ES2 are arranged under the floor of the passenger room 41, and the battery ES2 is arranged on the engine room 40 side.

In the engine room 40, the radiator CS1 is arranged in the most forward position. The PCU 30, the first tank 10, and the second tank 20 are arranged behind the radiator CS1. The PCU 30 is arranged above the first tank 10 and the second tank 20.

The first tank 10 is arranged in front of the second tank 20. The first tank 10 is arranged behind the radiator CS1 and below the PCU 30. The second tank 20 is arranged behind the first tank 10 in a position which is downward out of alignment with the first tank 10 in a vertical direction. For the sake of simplicity of description, the position of the first tank 10 shown in FIG. 3 is defined as the installation position 10a, and the position of the second tank 20 is defined as the installation position 20a.

Figure 4:
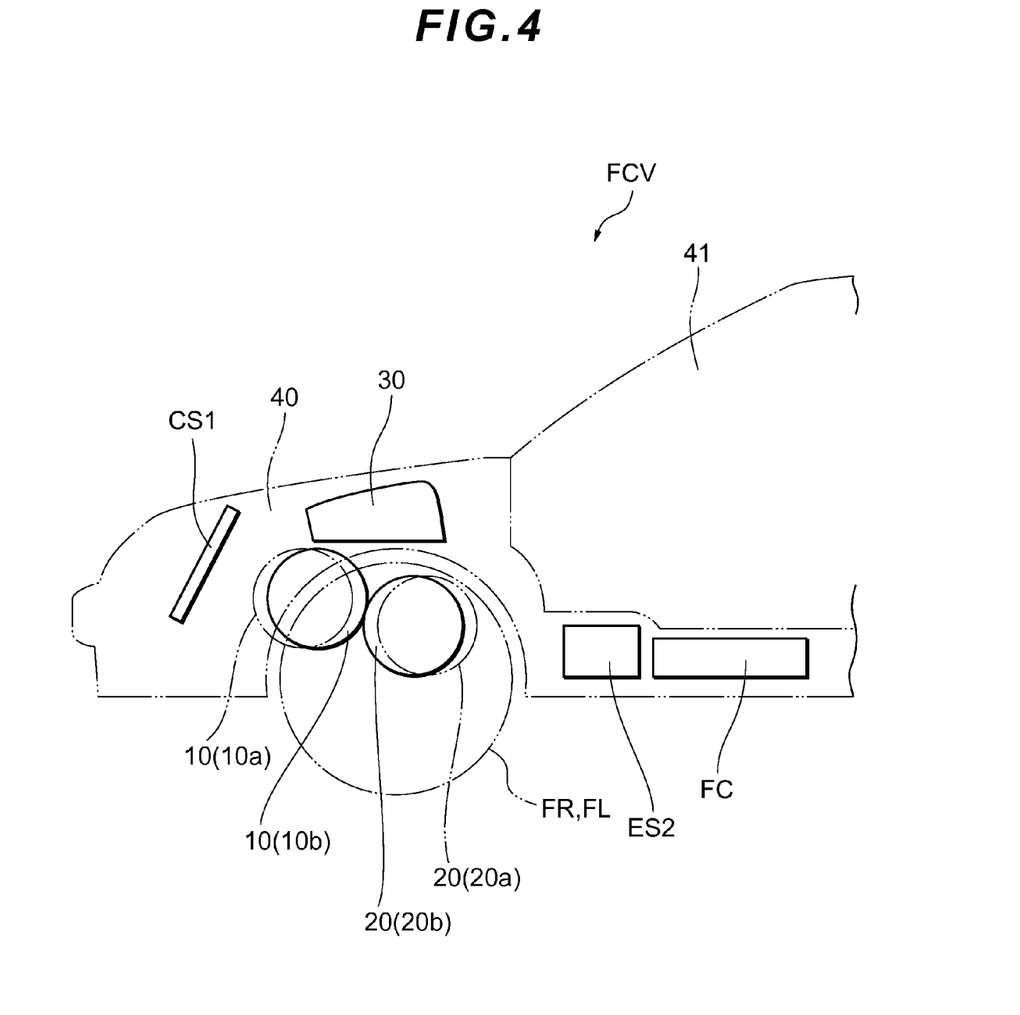
FIG. 4 is a side view showing the fuel cell system shown in FIG. 1, which is mounted on a fuel cell vehicle, and shows the condition of the fuel cell system in the initial stage of a collision.
Figure 5:
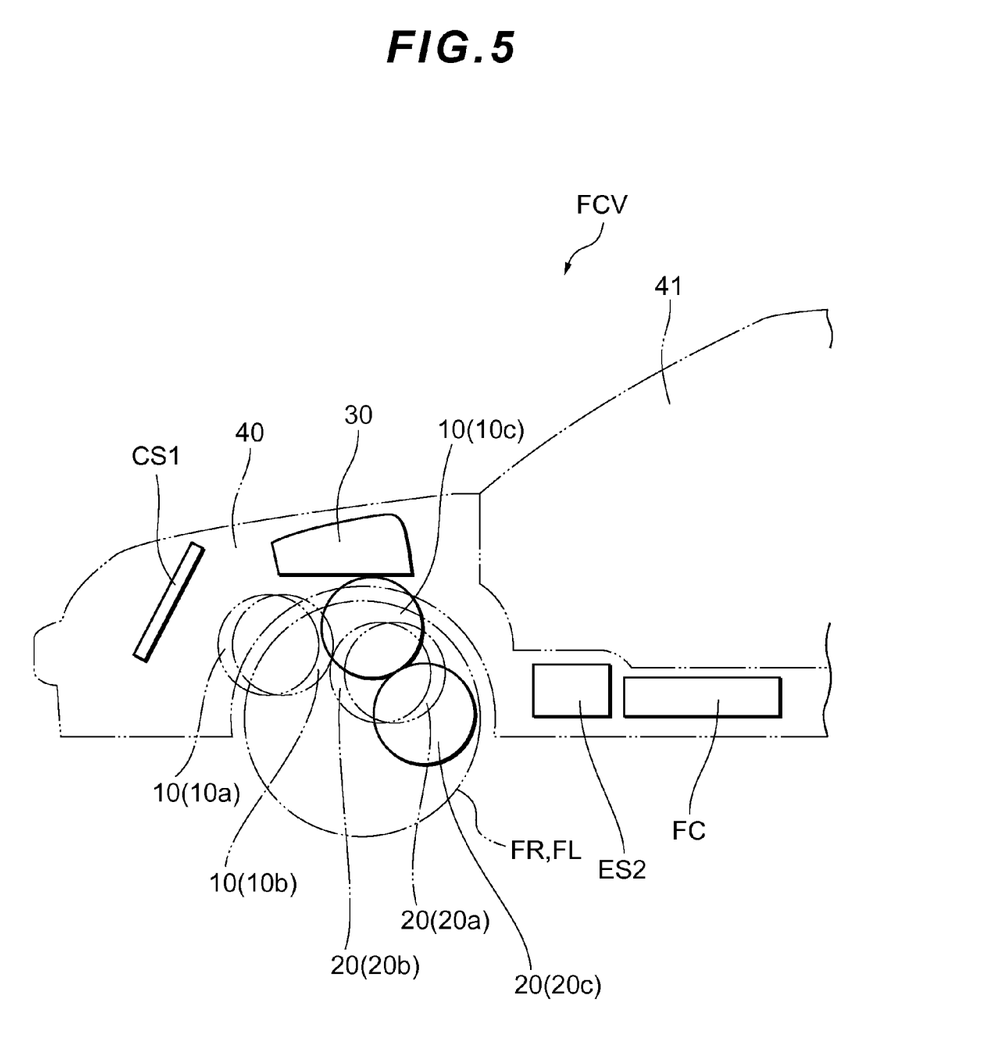
FIG. 5 is a side view of the fuel cell system shown in FIG. 1, mounted on a fuel cell vehicle, and shows the condition of the fuel cell system in the later stage of the collision.

Suppose that the fuel cell vehicle FCV in the condition shown in FIG. 3 collides, then the condition shown in FIG. 4 changes to the condition shown in FIG. 5. FIG. 4 is a side view of the fuel cell vehicle FCV, and shows the condition in the initial stage of collision. FIG. 5 is a side view of the fuel cell vehicle FCV, and shows the condition in the later stage of collision.

First, in the condition shown in FIG. 4 (the condition immediately after the collision), the first tank 10 moves backward by the impact of collision, and moves from an installation position 10a to an initial collision position 10b. On the other hand, the second tank 20 moves forward by inertia, and moves from an installation position 20a to an initial collision position 20b. The first tank 10 and the second tank 20 collide with each other and come to a condition of interference because of the movement of the first tank 10 from the installation position 10a to the initial collision position 10b and the movement of the second tank 20 from the installation position 20a to the initial collision position 20b.

In the first tank 10 at the stage of collision with the second tank 20, the energy of backward movement is greatly reduced by the collision. On the other hand, in the second tank 20 at the stage of collision with the first tank 10, the energy of forward movement is greatly reduced by the collision. As a result, the condition shown in FIG. 4 proceeds to the condition shown in FIG. 5.

The energy of backward movement of the first tank 10 is reduced because of the collision with the second tank 20, with the result that the first tank 10 moves backward a little and stops after the collision with the second tank 20. And because the first tank 10 is arranged above the second tank 20, the first tank 10 is pushed upward by the collision with the second tank 20. Therefore, the first tank 10 moves from the initial collision position 10b to the stop position 10c and stops there.

The energy of backward movement of the second tank 20 is reduced because of the collision with the first tank 10 and besides because the energy of forward movement of the second tank 20 by inertia is smaller than the energy of backward movement of the first tank 10 by the collision of the first tank 10, with the result that the second tank 20 moves backward a little and stops after the collision with the first tank 10. And because the second tank 20 is arranged below the first tank 10, the second tank 20 is pushed downward by the collision with the first tank 10. Therefore, the second tank 20 moves from the initial collision position 20b to the stop position 20c and stops there.

By arranging, as described above, the second tank 20 behind the first tank 10 in the installation position 20a which is downward out of alignment with the first tank 10 in a vertical direction, it is possible to control, at the time of collision, the direction of backward movement and amount of backward movement of the first tank 10 and the second tank 20. Therefore, it is possible to positively avoid the phenomena that the first tank 10 and the second tank 20 move toward the passenger room 41 side and that the first tank 10 and the second tank 20 collide with the battery ES2.

Figure 6:
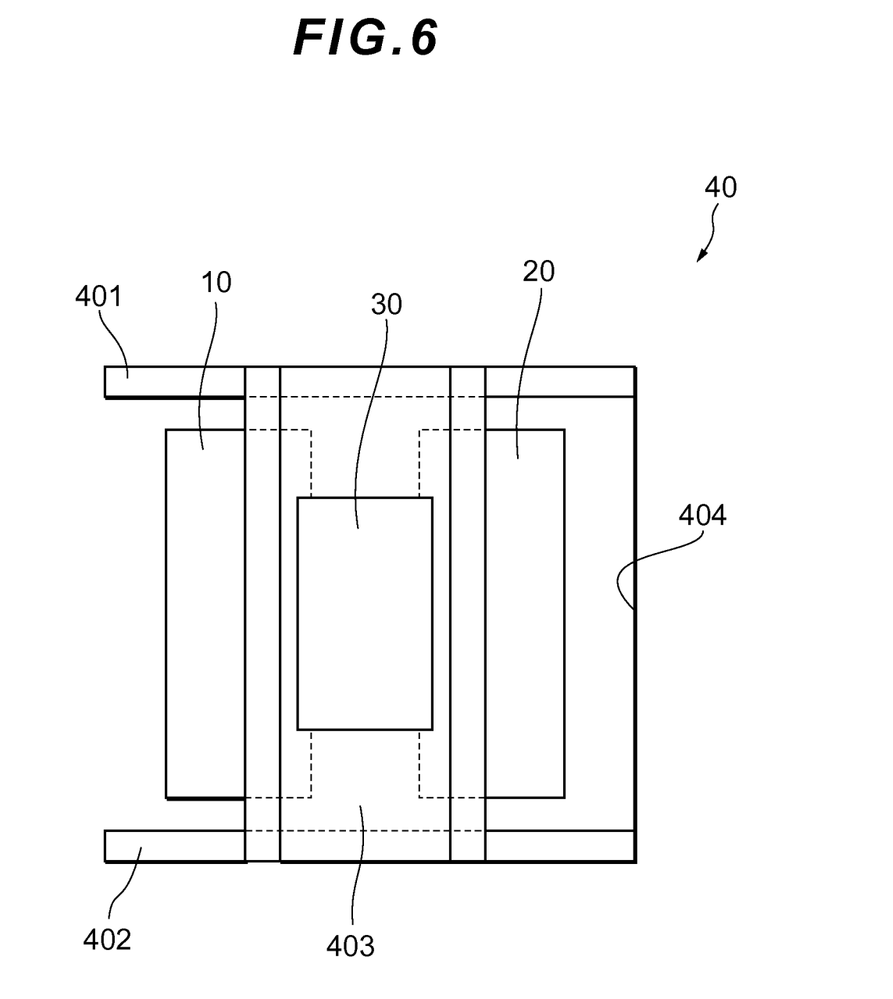
FIG. 6 is a plan view showing a part where tanks and a PCU are mounted.
Figure 7:
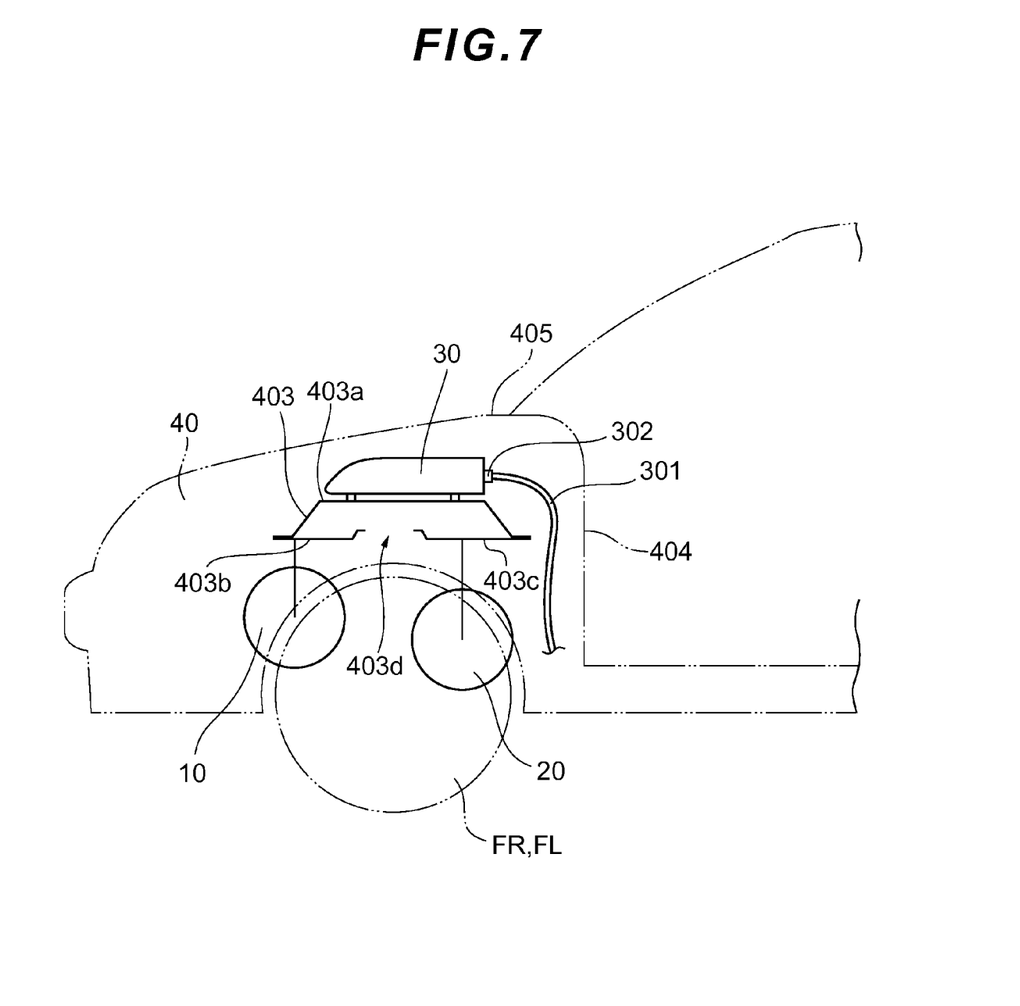
FIG. 7 is a side view showing a part where tanks and a PCU are mounted.
Figure 8:
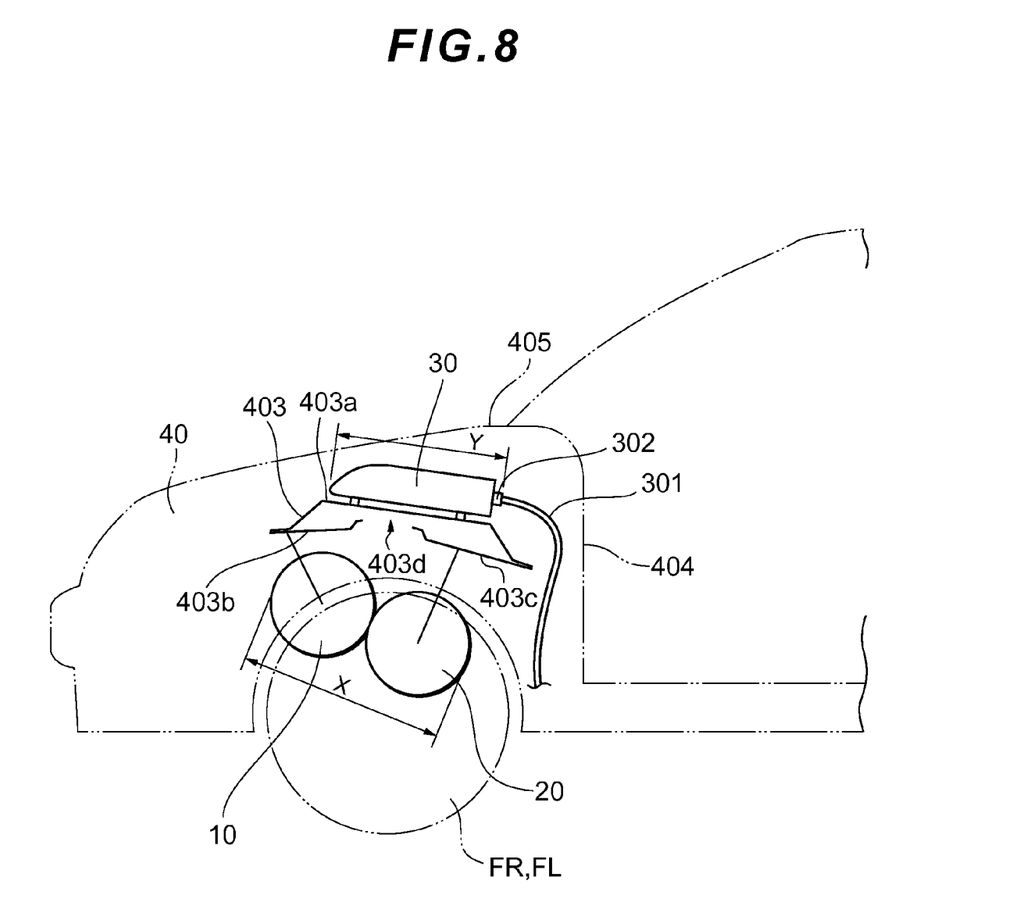
FIG. 8 is a side view showing a part where tanks and a PCU are mounted, and shows the condition of the tanks and the PCU in the later period of the collision.

It is more preferred that the first tank 10 and the second tank 20 be fixed to the cross member in the engine room 40. This aspect will be described with reference to FIGS. 6, 7 and 8. FIG. 6 is a plan view of the part where the first tank 10 and the second tank 20 are mounted, and FIG. 7 is a side view thereof. FIG. 8 is a side view showing the condition after the occurrence of front impact from the condition shown in FIG. 7.

As shown in FIG. 6, in the engine room 40, side members 401, 202 are arranged along the front-rear direction (the horizontal direction in the figure). A cross member 403 is arranged from the side member 401 to the side member 402. The cross member 403 is fixed to the side member 401 and the side member 402. The PCU 30 is placed on the cross member 403 and connected thereto, and also the first tank 10 and the second tank 20 are fixed.

As shown in FIG. 7, the cross member 403 is formed to have a cross section in a roughly trapezoidal shape. The cross member 403 is such that a placement surface 403a is formed in a position corresponding the upper side of the trapezoid. In the position opposed to the placement surface 403a, a first mounting portion 403b and a second mounting portion 403c are formed. A hole 403d constituting a brittle portion is formed between the first mounting portion 403b and the second mounting portion 403c. What constitutes the brittle portion is not limited to the hole 403d, and a bead for deformation may also be used.

The PCU 30 is placed on the placement surface 403a and fixed thereto. A high-voltage cable 301 extends from the connection 302 of the PCU 30. The direction in which the high-voltage cable 301 extends from the PCU 30 is on the dash panel 404 side. Between the PCU 30 and the hood 405, a prescribed gap is provided in order to protect pedestrians. The first tank 10 is fixed to the first mounting portion 403b in a suspended manner. The second tank 20 is fixed to the second mounting portion 403c in a suspended manner.

The first tank is arranged in front of the second tank 20. The first tank 10 is arranged in front of the second tank 20 in a position which is upward out of alignment with the second tank 20 in a vertical direction. The second tank 20 is arranged behind the first tank 10 and in a position which is downward out of alignment with the first tank 10 in a vertical position.

Suppose that the fuel cell vehicle FCV in the condition shown in FIG. 7 collides, then the fuel cell vehicle FCV comes to the condition shown in FIG. 8. As shown in FIG. 8, the first tank 10 moves backward by the impact of collision. On the other hand, the second tank 20 moves forward by inertia. The first tank 10 is attached to the first mounting portion 403b of the cross member and the second tank 20 is attached to the second mounting portion 403c of the cross member. Therefore, a bending force is applied to the cross member 30 by the backward movement of the first tank 10 and the forward movement of the second tank 20. Because the cross member 30 is provided with the hole 403d which functions as the brittle portion, the cross member 30 becomes bent in this portion to absorb the impact. Because the first tank 10 and the second tank 20 are fixed to the cross member 30, the movement of the tanks is restricted and the fuel cell vehicle FCV stops in a condition of collision as shown in FIG. 8.

And as shown in FIG. 8, the PCU 30 performs a rotational movement as a result of the above-described deformation of the cross member 30, in such a manner that the rear area thereof from which the high-voltage cable extends lowers and the front area thereof rises. Because the gap for protecting pedestrians is present between the PCU 30 and the hood 405 above the PCU 30, no interference with the hood 405 due to the rotational movement of the PCU 30 occurs. Because there is also a gap between the PCU 30 and dash panel 404 behind the PCU 30, no interference occurs between the high-voltage cable 301 extending from the PCU 30 and the dash panel 404 and hence it is possible to positively avoid damage to the high-voltage cable 301. As shown in FIG. 8, the front-rear length Y of the PCU 30 is smaller than the length X along the radial direction in the case where the first tank 10 and the second tank 20 come into contact with each other (the sum of the diameter of the first tank 10 and the diameter of the second tank 20) and, therefore, it is possible avoid the phenomenon that the PCU is crushed.

In a configuration as in this embodiment, the right front-wheel motor ES4R is a driving motor for driving the right front wheel FR and is arranged in the right front wheel FR in the vicinity of the right front wheel FR, providing what is called the in-wheel motor type. Similarly on the left side, the left front-wheel motor ES4L provides the in-wheel motor type in which the left front-wheel motor ES4L is arranged in the in the vicinity of the left front wheel FL. Therefore, when the in-wheel motor type is simply adopted, a mere space in which there is no driving motor nor a transaxle is provided in the engine room 40, and the weight balance of the front and rear becomes lost, resulting in a decrease in the slope-ascending performance and driving performance. However, by arranging heavy loads, such as the first tank 10 and the second tank 20, in the engine room 40 as in this embodiment, it is possible to keep a good balance of the whole fuel cell vehicle FCV and good slope-ascending performance and driving performance can be ensured. Furthermore, the arrangement in the engine room 40 is such that the second tank 20 is arranged behind the first tank 10 and below the first tank 10. Therefore, the degree of freedom of the arrangement of other parts and devices is increased and also the degree of freedom of design of the front area of the fuel cell vehicle FCV is increased, with the result that it becomes possible to make a design peculiar to the fuel cell vehicle FCV.

If the first tank 10 and the second tank 20 fabricated robust are arranged in the width direction of the engine room 40 as in this embodiment, in both cases of both full-lap impact and ODB impact it is possible to receive external forces in the same way and hence this is structurally effective.

It is also preferred that the second tank 20 be arranged downward out of alignment with the battery ES2. By arranging the second tank 20 in a low position like this, it is possible to prevent damage to the battery ES2 in the event of road surface interference and riding over a stepped road surface.

It is also preferred that in the condition shown in FIG. 4, the length between the front end of the first tank 10 and the rear end of the second tank 20 be longer than the front-rear length of the PCU 30. By adjusting the length of the front-rear length of the PCU 30 like this, it is possible to guard the PCU 30 with the robust first tank 10 and the second tank 20.

What is claimed is:

1. A fuel cell vehicle comprising:
a fuel cell which generates electricity by an electrochemical reaction when supplied with a reaction gas;
a gas storage section which stores the reaction gas to be supplied to the fuel cell or a raw material gas which becomes the reaction gas; and
a battery capable of storing electricity generated by the fuel cell;
wherein the gas storage section has at least a first tank and a second tank,
wherein the first tank and the second tank are arranged in a front area of the fuel cell vehicle,
wherein the second tank is arranged nearer to a rear area than the first tank, the second tank is arranged to be lower than the first tank, and the second tank is arranged in a position lower than at least the battery,
wherein the first tank and the second tank are fixed to a cross member extending in the width direction of the fuel cell vehicle, and
wherein the cross member has a brittle portion between a part which fixes the first tank and a part which fixes the second tank.

2. The fuel cell vehicle according to claim 1, wherein a driving motor for driving wheels is arranged in the vicinity of the wheels.

* * * * *

UNITED STATES PATENT AND TRADEMARK OFFICE
CERTIFICATE OF CORRECTION

PATENT NO.        : 8,607,909 B2
APPLICATION NO.   : 13/377447
DATED             : December 17, 2013
INVENTOR(S)       : Yasuhiko Ohashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 41 days.

Signed and Sealed this
Twenty-second Day of September, 2015

Michelle K. Lee
*Director of the United States Patent and Trademark Office*